Jan. 17, 1967     D. BRAND     3,298,489
HYDRAULIC VARIABLE TORQUE TRANSMITTER
Filed Feb. 23, 1965     3 Sheets-Sheet 1
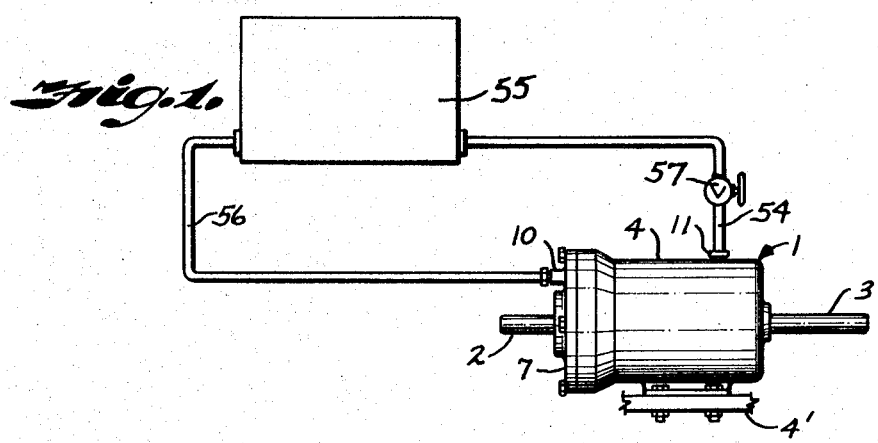
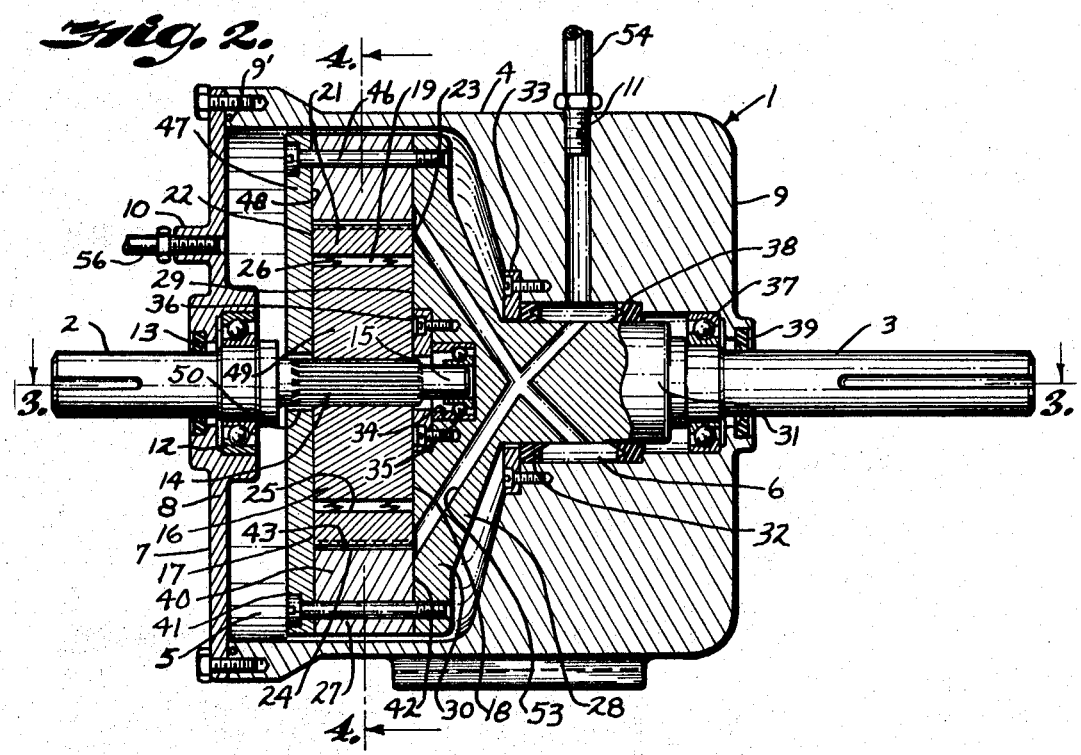
INVENTOR.
Daniel Brand
BY
Fishburn and Gold
ATTORNEYS INVENTOR.
Daniel Brand
BY
Fishburn and Gold
ATTORNEYS Jan. 17, 1967 D. BRAND 3,298,489
HYDRAULIC VARIABLE TORQUE TRANSMITTER
Filed Feb. 23, 1965 3 Sheets-Sheet 3

INVENTOR.
Daniel Brand
BY
Fishburn and Gold
ATTORNEYS

United States Patent Office 3,298,489
Patented Jan. 17, 1967

3,298,489
HYDRAULIC VARIABLE TORQUE TRANSMITTER
Daniel Brand, 5207 S. Oxford Ave., Tulsa, Okla. 74135
Filed Feb. 23, 1965, Ser. No. 434,526
6 Claims. (Cl. 192—58)

This invention relates to force transmitting devices and more particularly to improved coupling apparatus adapted for varying torque transmitted between an input and output shaft.

The principal objects of the present invention are: to provide a variable torque transmitting apparatus which permits extremely fine torque control between an input and an output shaft; to provide such apparatus which is of relatively simple construction; to provide such apparatus which uses a stationary exterior housing and is easily adapted for a multiplicity of uses; to provide such a device which has relatively few parts, and to provide such apparatus which is rugged and reliable in use.

Other objects and advantages of this invention will become apparent from the following description taken in connection with the accompanying drawings wherein are set forth by way of illustration and example certain embodiments of this invention.

FIG. 1 is a partially schematic diagram showing a device embodying this invention connected into an hydraulic flow circuit.

FIG. 2 is a longitudinal cross-sectional view through the device on a scale enlarged from that of FIG. 1 showing the interior of the device.

Figure 3:
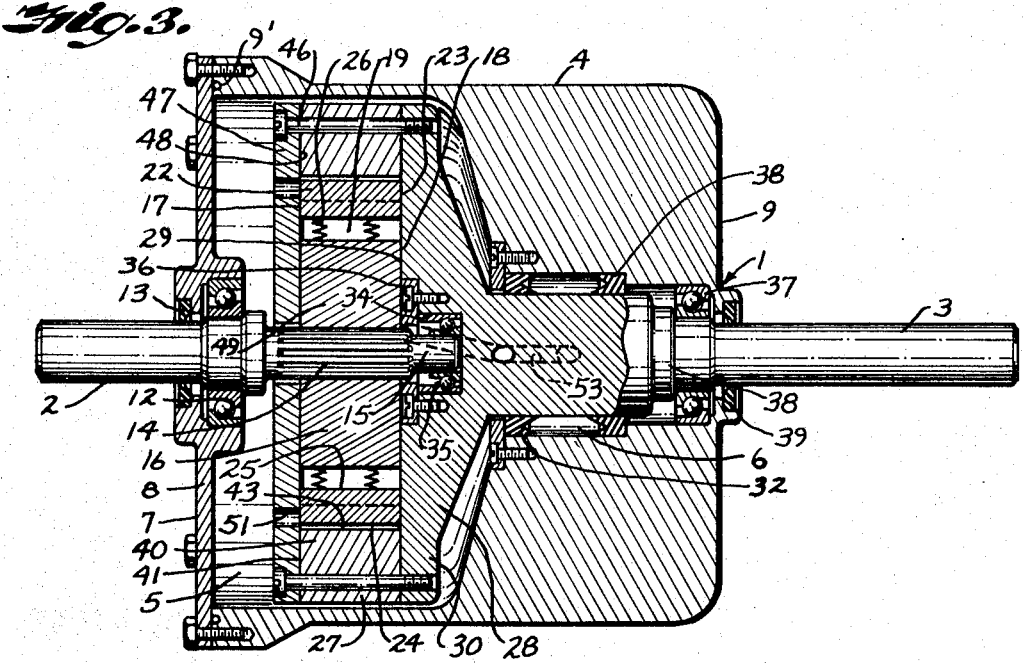
FIG. 3 is a longitudinal cross-sectional view through the device taken on the line 3—3, FIG. 2.

Referring to the drawings in more detail:

The reference numeral 1 generally indicates an hydraulic torque transmitting device embodying this invention having an input shaft 2, an output shaft 3 coaxial with the shaft 2 and a housing 4 for mounting on suitable retaining structure 4'. The housing 4 is stationary with respect to the structure 4' and is hollow as best illustrated in FIGS. 2 and 3 forming a cylindrical first chamber 5 of relatively large diameter and an adjoining cylindrical second chamber 6 coaxially aligned with the chamber 5 but of relatively small diameter. The housing 4 is generally cylindrical in shape having a front end 7 covered by a cap 8 closing the first chamber 5, and a rear end 9. An O-ring seal 9' prevents leakage between the cap 8 and housing 4. An inlet port 10 is formed through the cap 8 and communicates with the first chamber 5 while an outlet port 11 is formed in the housing 4 communicating with the second chamber 6.

The input shaft 2 extends past the front end 7 of the housing 4 coaxially into the first chamber 5 and is rotatably supported by means of a bearing 12 retained by the cap 8. The cap 8 also supports a seal 13 in contact with the input shaft 2 to prevent leakage at the line of relative movement between the shaft and seal. The input shaft 2 has a splined intermediate portion 14 within the first chamber 5 and terminates in a stub 15, the purpose of which is noted below.

A rotor disc 16 has an internal spline matching and coaxially receiving the splined portion 14 of the input shaft 2 for rotation of the rotor disc with the shaft 2. The rotor disc 16 has opposed parallel flat surfaces 17 and 18 extending in spaced apart planes normal to the axis of the input shaft 2. The rotor disc 16 is shaped to form a plurality of circumferentially spaced slots 19 extending axially of the disc between the surfaces 17 and 18 and radially inwardly from the periphery 20 of the disc. Vanes 21 have opposed parallel ends 22 and 23 spaced apart the thickness of the disc 16 that is the distance between the surfaces 17 and 18, and radially outer and inner surfaces 24 and 25 respectively. The vanes 21 are slidably received in the slots 19 for radial movement with respect to the disc 16. Resilient spring members 26 extend between the roots of the slots 19 and into the vanes 21 through the inner surface 25 for resiliently urging the vanes and specifically the outer surfaces thereof radially outwardly of the disc 16.

A rotor case 27 is located within the housing 4 and is fixed to the output shaft 3 for rotation therewith. The rotor case 27 includes a base member 28 having a flat surface 29 located in the first chamber 5 and extending normally or transversely to the axis of the output shaft 3. The base member 28, in the illustrated example, is somewhat conical in shape and has a larger diameter portion 30, which forms the flat surface 29, contained within the first chamber 5 and a portion or stem 31 of relatively smaller diameter contained within the second chamber 6. A high pressure seal 32 extends between the housing 4 and the stem or portion 31 of the base member 28 for isolating the second chamber 6 from the first chamber 5. A retainer 33 secures the seal 32 in place between the respective chambers.

The larger diameter portion 30 of the base member 28 has a recess or depression 34 coaxially bored thereinto from the surface 29 and receiving a bearing 35 which rotatably supports the stub 15 of the input shaft 2. A bearing retainer 36 maintains the bearing 35 in proper position. The output shaft 3 supports the rotor case 27 for rotation within the housing 4 on a bearing 37 adjacent the rear end 9 of the housing. A high pressure seal 38 similar to the seal 32 isolates the second chamber 6 from the bearing 37 and an output shaft seal 39 prevents residual leakage between the housing 4 and output shaft 3.

Figure 4:
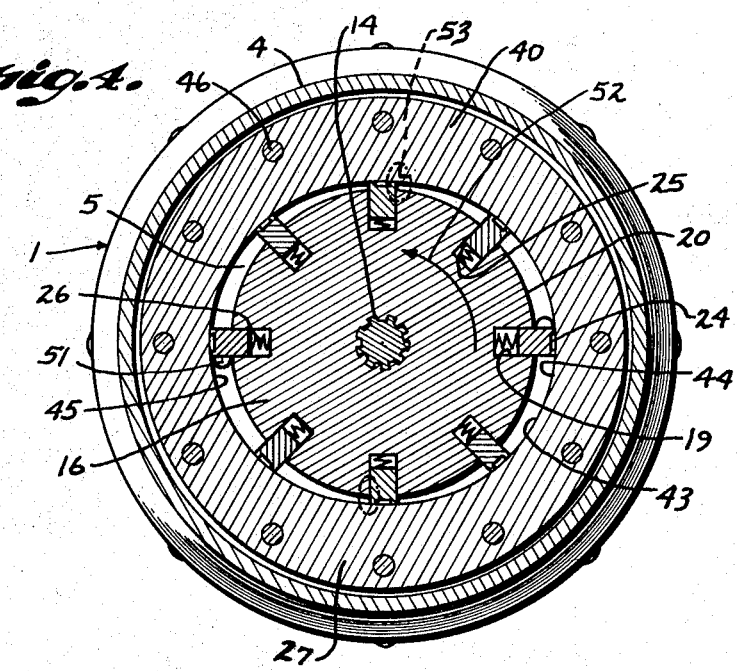
FIG. 4 is a transverse cross-sectional view through the device taken on the line 4—4, FIG. 2, particularly showing a vane pump arrangement.

The rotor case 27 includes a cam ring 40 having opposed parallel faces 41 and 42 spaced apart a distance only very slightly greater than the distance between the disc surfaces 17 and 18, and an interior cam surface 43. In the illustrated example, the interior cam surface 43 is composed of opposed lobes 44 and 45 which produce internal ring diameters or dimensions greater in the horizontal than the vertical direction as shown in FIG. 4. The ring 40 is secured with the face 42 in contact with the base member surface 29 by means of circumferentially spaced cap screws 46 which extend in an axial direction through the cam ring 40 and are threadedly engaged into the base member 28. A cap plate 47 is contained in the first chamber 5 and has a flat surface 48 urged against the cam ring face 41 with the cap screws 46. The plate 47, ring 40 and base member 28 form a chamber 49 defined by the interior cam surface 29.

The input shaft 2 extends through the cap plate 47 by means of a bore 50 and into the chamber 49. The rotor disc 16 is contained snugly within the chamber 49 with the disc flat surfaces 17 and 18 and vane ends 22 and 23 respectively slidably contacting the plate surface 48 and the base member surface 29. The vane outer surfaces 24 slidably contact the cam surface 43 and are resiliently urged thereagainst by the spring members 26.

Suction passageways 51 extend through the cap plate 47 between the disc periphery 20 and the cam surface 43 at the wider diameter or dimension of the cam surface 43. The suction passageways 51 allow hydraulic fluid contained within the first chamber 5 to freely pass into the space between the cam ring inner surface and disc periphery. Under the influence of the disc 16, moving in the direction of the arrow 52, FIG. 4, a varying volume is produced between respective vanes producing a pumping action. Discharge passageways 53 are circumferentially displaced from the suction passageways 51 so as to be adjacent the narrower diameter or dimension of the ring inner surface 43. The passageways 53 extend through the interior of the base member 28 in a manner to provide communication into the housing second chamber 6 from the base member surface 29 adjacent the vanes 21.

A flow tube or line 54 extends from the outlet port 11 to a tank 55 and a second tube or flow line 56 communicates between the tank 55 and the inlet port 10. A variable flow rate valve 57 is interposed in the line 54 to control flow rate therethrough from the outlet port 11.

In operation, the housing is substantially filled with hydraulic fluid and a suitable driving member (not shown) is engaged with the input shaft 2 to produce rotation thereof. A driven member (not shown) is engaged with the output shaft 3. As the shaft 2 is driven the rotor disc 16 is driven at the same speed producing a positive displacement pumping of fluid from the first chamber 5 toward the second chamber 6 by means of the suction passageways 51, vane cooperation within the chamber 49, and discharge passageways 53. The hydraulic fluid entering the second chamber 6 is urged through the outlet port 11 through the line 54 into the tank 55 from which it re-circulates by means of the line 56 into the first chamber 5.

So long as the valve 57 remains open, relatively free flow is permitted through the line 54 and, therefore, easy relative motion is permitted between the rotor disc 16 and the rotor case 27. Under these conditions only residual torque is transmitted to the output shaft 3 and if the resisting torque on the shaft 3 exceeds this residual torque, the output shaft 3 remains stationary.

By closing the valve 57, resistance is provided against the discharge of fluid from the second chamber 6 which produces an increase in resistance against relative motion between the disc 16 and case 27. When this resistance against relative motion exceeds the torque resistance applied to shaft 3, the case 27 will begin to rotate with the input shaft 2 at a speed equal to or less than the speed of the input shaft 2 depending upon the torque load characteristics applied to shaft 3. If the valve 57 is completely closed so that no fluid may escape from the chamber 6, the shafts 2 and 3 are essentially locked together since substantially no relative motion is permitted between the disc 16 and case 27. With the above described structure very fine torque control may be achieved.

Figure 5:
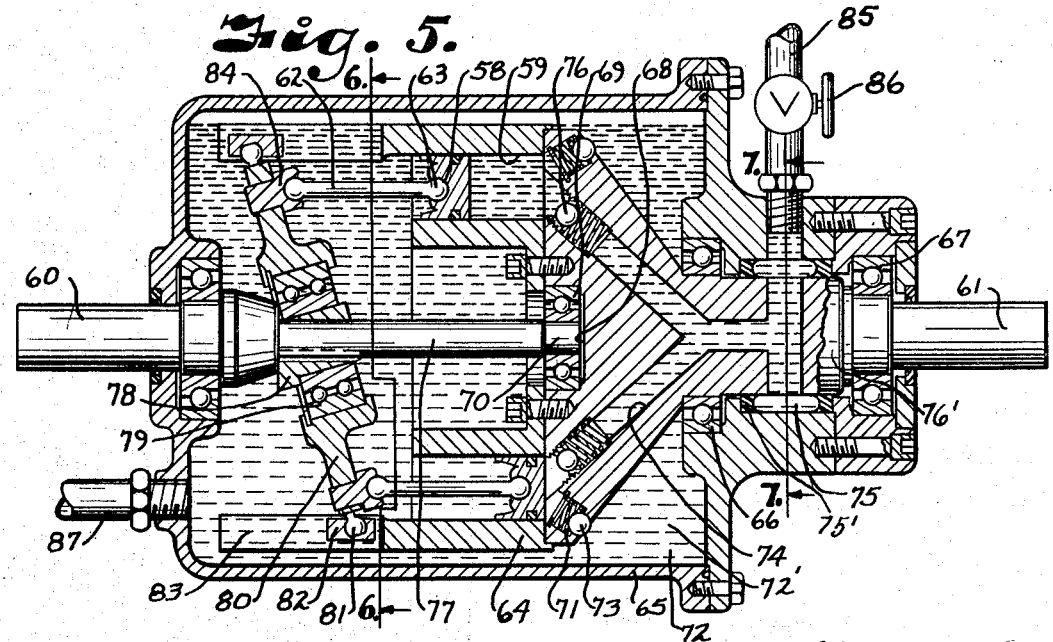
FIG. 5 is a cross-sectional view through a modified device embodying this invention which uses a piston pump arrangement.
Figure 6:
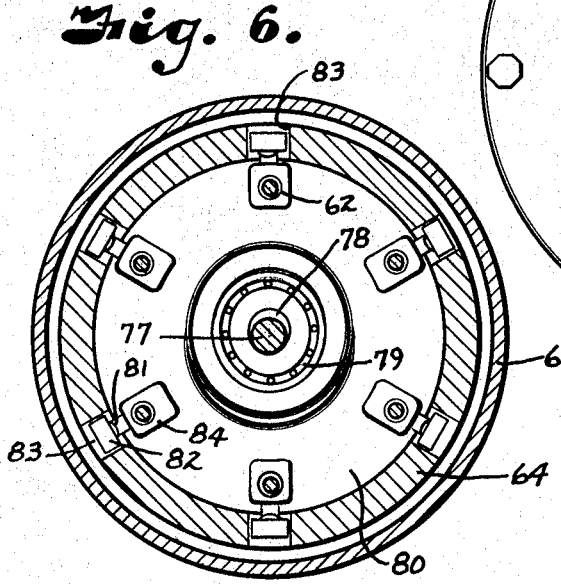
FIG. 6 is a transverse cross-sectional view through the device taken on the line 6—6, FIG. 5.
Figure 7:
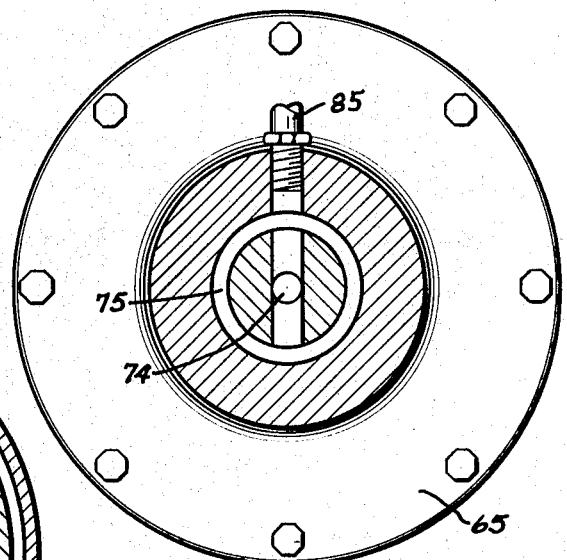
FIG. 7 is a transverse cross-sectional view through the device taken on the line 7—7, FIG. 5.

Referring to FIGS. 5, 6 and 7, a second embodiment of this invention is shown which varies from the above-described embodiment in that an arrangement of pistons 58 is used to provide the pumping accomplished in the above described embodiment by the vanes. The pistons 58 are slidably contained in piston receiving cylinders 59 circumferentially spaced and extending axially of the input shaft 60 and output shaft 61 which is coaxial with the shaft 60. In the illustrated example, there are six pistons 58 equally circumferentially spaced and each has a piston rod 62 extending rearwardly thereof generally axially of the cylinders 59 but pivotable with respect thereto on ball joints 63.

The output shaft 61 rotates with a rotor case 64 in which is formed the cylinders 59. A portion of the shaft 61 and the rotor case 64 rotate within the hollow housing 65 on spaced bearings 66 and 67. The rotor case 64 has a recess or depression 68 coaxially extending thereinto and receiving a bearing 69 which receives a stud 70 forming the inner end of the input shaft 60. Input passageways 71 are formed in the rotor case 64 for directing hydraulic fluid 72 from the interior portion 72' of the housing 65 into the respective cylinders 59 past a ball check valve 73. The portion 72 corresponds with the first chamber 5 in the first described embodiment. Discharge passageways 74 are also formed in the rotor case 64 and communicate at one end thereof with the respective cylinders 59 and at the other end thereof with a discharge chamber 75 formed between the output shaft 61 and the housing 65 and corresponding to the second chamber 6 in the first described embodiment. A ball check valve 76 limits flow through the discharge passageways 74 only in a direction toward the chamber 75. It can thus be seen that the reciprocation of the pistons 58 in the cylinders 59 produces a pumping action of the fluid 72 into the chamber 75. A high pressure seal 75' similar to the seal 32 extends between the housing 65 and the stem 76' corresponding to the stem or portion 31, thus separating the chamber 75 from the chamber or interior portion 72'.

An intermediate portion 77 of the input shaft 60 carries a rotary cam member or rotor 78 keyed thereto and supporting a bearing 79 at an oblique angle to the axis of the input shaft 60. A crank member 80 receives the bearing 79 in the center thereof and terminates in radially outwardly extending circumferentially spaced ball joint members 81 received in respective slide blocks 82. The slide blocks 82 are received in axially extending guide slots 83 formed by the rotor case 64. The crank member 80 also has ball joint receivers 84 secured thereto facing the bottom of the pistons 58 and receiving the respective free ends of the piston rods 62.

By way of operation, relative rotation between the input shaft 60 and output shaft 61 produces a relative rotation between the cam member 78 and the crank member 80. This produces progressive wobbling of the crank member 80 about the axis of the shaft 60 which causes a circumferentially progressive axial motion of the slide blocks 82 and thus axial reciprocation of the respective piston rods 62 and pistons 58. This results in a positive displacement pumping of the fluid 72 into the chamber 75 and out the discharge line 85 past the valve 86, subsequently producing a return of the fluid through an intake line 87 communicating with the housing 65.

By restricting flow through the valve 86 in the discharge line, the pistons 58 experience increased resistance in pumping the fluid, which resistance is transmitted through the crank member 80 resulting in a resistance against the rotation of the input shaft 60. It can thus be seen that if the valve 86 is completely closed, the output shaft 61 must turn at essentially the same speed as the input shaft 60. Also, by controlling the flow through the valve 86, fine torque control can be experienced between the input shaft 60 and the output shaft 61.

Although certain embodiments of this invention have been illustrated and described, it is not to be limited thereto except insofar as such limitations are included in the claims.

What I claim and desire to secure by Letters Patent is:
1. A variable torque transmitter comprising:
(a) a housing having a fluid receiving first chamber and a fluid receiving second chamber, an inlet port and an outlet port respectively communicating through said housing with said chambers, input and output shafts rotatably mounted on said housing and respectively extending into said housing,
(b) a rotor member in said housing and rotatably fixed to one of said shafts for rotation therewith, a rotor case in said housing and rotatably fixed to the other of said shafts for rotation therewith, a seal cooperating between said housing and said rotor case and isolating said chambers from each other,
(c) pump means cooperating between said rotor member and rotor case for receiving fluid from said first chamber and applying pumping force thereto upon relative rotary motion between said rotor member and rotor case, means forming a passageway for directing fluid from said pump means to said second chamber, (d) flow line means extending between said inlet port and said outlet port, and a variable flow valve in said line means to selectively restrict flow from said second chamber through said line means for controlling torque transferred between said input and output shafts.

2. The structure as set forth in claim 1 wherein:
(a) said pump means are positive displacement pump means.

3. The structure as set forth in claim 1 wherein:
(a) said pump means comprises a plurality of vanes.

4. The structure as set forth in claim 1 wherein:
(a) said pump means comprises a plurality of pistons.

5. The structure as set forth in claim 1 wherein:
(a) said rotor case includes a plurality of piston cylinders and said pump means includes a plurality of pistons received in said cylinders,
(b) said rotor member including a cam and a crank member rotatably fixed with respect to said rotor case and obliquely mounted on said cam, and
(c) piston rods connected between said crank member and said pistons for progressively reciprocating said pistons upon relative rotation between said input shaft and output shaft.

6. A variable torque transmitter comprising:
(a) a hollow stationary housing having opposed ends and a first fluid receiving chamber and a second fluid receiving chamber, an inlet port and an outlet port respectively communicating with said chambers, coaxially aligned input and output shafts respectively extending into said housing through said ends, bearings rotatably mounting said shafts on said housing,
(b) a rotor member in said housing and rotatably fixed to said input shaft for rotation therewith, said rotor member being disc-shaped and having a plurality of circumferentially spaced slots extending radially inwardly from the periphery thereof, vanes slidably received in said respective slots for radial movement with respect to said disc, resilient members between said vanes and said disc for resiliently urging said vanes outwardly of said disc,
(c) a rotor case in said housing and rotatably fixed to said output shaft for rotation therewith, said rotor case extending between said first and second chambers, a seal extending between said housing and said rotor case for isolating said second chamber from said first chamber,
(d) said rotor case including a cam ring having an interior cam surface, said rotor case forming a chamber receiving a portion of said input shaft and said rotor disc, said vanes slidably contacting said cam surface to form a positive displacement pump,
(e) pump suction passageways extending through said rotor case to provide communication thereinto adjacent said vanes from said housing first chamber, pump discharge passageways circumferentially displaced from said suction passageways and extending through said rotor case to provide communication into said housing second chamber from said rotor case adjacent said vanes,
(f) flow line means extending between said inlet port and said outlet port, and a variable flow valve in said line means to control flow rate from said second chamber for controlling torque transferred between said input and output shafts.

References Cited by the Examiner
UNITED STATES PATENTS

| | | | |
|---|---|---|---|
| 2,293,731 | 8/1942 | Frederickson | 192—59 |
| 2,581,172 | 1/1952 | Carson | 192—58 |

DAVID J. WILLIAMOWSKY, *Primary Examiner.*

A. T. McKEON, *Assistant Examiner.*